United States Patent
Suzuki et al.

(10) Patent No.: US 11,876,561 B2
(45) Date of Patent: Jan. 16, 2024

(54) SIGNAL PROCESSOR, ROF TRANSCEIVER, FIBER OPTIC RADIO SYSTEM, AND SIGNAL PROCESSING METHOD

(71) Applicant: YAZAKI CORPORATION, Tokyo (JP)

(72) Inventors: Toshinori Suzuki, Kanagawa (JP); Takamitsu Aiba, Kanagawa (JP)

(73) Assignee: YAZAKI CORPORATION, Tokyo (JP)

( * ) Notice: Subject to any disclaimer, the term of this patent is extended or adjusted under 35 U.S.C. 154(b) by 23 days.

(21) Appl. No.: 17/901,491

(22) Filed: Sep. 1, 2022

(65) Prior Publication Data

US 2023/0070232 A1 Mar. 9, 2023

(30) Foreign Application Priority Data

Sep. 6, 2021 (JP) ................. 2021-144438

(51) Int. Cl.
*H04B 10/2575* (2013.01)
*H04B 10/40* (2013.01)

(52) U.S. Cl.
CPC ....... *H04B 10/25759* (2013.01); *H04B 10/40* (2013.01); *H04B 10/2575* (2013.01); *H04B 10/25752* (2013.01)

(58) Field of Classification Search
None
See application file for complete search history.

(56) References Cited

U.S. PATENT DOCUMENTS

| 2005/0276320 | A1  | 12/2005 | Tsubosaka et al. |
| 2012/0076499 | A1  | 3/2012  | Sun |
| 2015/0229397 | A1* | 8/2015  | Shibata ............ H04B 10/25754 398/115 |
| 2016/0360571 | A1* | 12/2016 | Yokosawa ........... H04W 88/085 |
| 2021/0203297 | A1* | 7/2021  | Jakobsson ................ H04B 1/16 |

FOREIGN PATENT DOCUMENTS

| JP | 9-98130 A     | 4/1997  |
| JP | 11-225113 A   | 8/1999  |
| JP | 2005-354336 A | 12/2005 |
| JP | 2019-153945 A | 9/2019  |

* cited by examiner

*Primary Examiner* — Darren E Wolf
(74) *Attorney, Agent, or Firm* — Sughrue Mion, PLLC

(57) ABSTRACT

Provided is a signal processor provided in a transceiver for transmitting and receiving a radio signal, and including a branch unit, a detection unit, a determination unit, and a power source controller. The branch unit branches a transmission signal and acquires a branch signal. The detection unit detects the branch signal and acquires a voltage value of the branch signal. The determination unit compares the voltage value of the branch signal with a threshold voltage previously stored in a storage unit and determines whether the voltage value of the branch signal is equal to or greater than the threshold voltage. The power source controller controls turning on and off of a power source for a reception signal amplifier of the transceiver according to a determination result determined by the determination unit.

5 Claims, 5 Drawing Sheets

SIGNAL PROCESSOR, ROF TRANSCEIVER, FIBER OPTIC RADIO SYSTEM, AND SIGNAL PROCESSING METHOD

CROSS-REFERENCE TO RELATED APPLICATIONS

The present application is based on, and claims priority from Japanese Patent Application No. 2021-144438, filed on Sep. 6, 2021, the entire contents of which are incorporated herein by reference.

TECHNICAL FIELD

The present disclosure relates to a signal processor, an RoF transceiver, a fiber optic radio system, and a signal processing method.

BACKGROUND

Fiber optic radio (RoF: Radio over Fiber) technology for transmitting and receiving radio signals via fiber optic transmission lines has been proposed as a means for relaying and transmitting radio signals to distant places. In this fiber optic radio, what is called a signal roundabout may occur, in which a part of a signal transmitted from a transmission antenna is input to a reception antenna at the same frequency directly or indirectly by reflection or the like. JP 2019-153945 A discloses a roundabout signal remover for preventing deterioration of signal quality due to a roundabout fiber optic radio signal. The roundabout signal remover disclosed in JP 2019-153945 A returns a part of a signal transmitted from a transmitter, to the reception side as a suppression signal and combines it with a reception signal in which the roundabout has occurred, thereby suppressing transmission.

SUMMARY

In the roundabout signal remover disclosed in JP 2019-153945 A, it is necessary to separately monitor the level and the delay time of the roundabout signal, and it is also necessary to provide delay circuits according to frequencies. That is, in the conventional roundabout signal remover, the circuit scale and the amount of calculation processing become enormous, which increases the cost and further causes delays associated with signal processing.

An object of the disclosure is to provide a signal processor capable of suppressing roundabout signals with a simple configuration.

A signal processor of the present disclosure is a signal processor provided in a transceiver for transmitting and receiving a radio signal and includes a branch unit that branches a transmission signal and acquires a branch signal, a detection unit that detects the branch signal and acquires a voltage value of the branch signal, a determination unit that compares the voltage value of the branch signal with a threshold voltage previously stored in a storage unit and determines whether the voltage value of the branch signal is equal to or greater than the threshold voltage, and a power source controller that controls turning on and off of a power source for a reception signal amplifier of the transceiver according to a determination result determined by the determination unit.

An RoF transceiver of the present disclosure is an RoF (Radio over Fiber) transceiver for relaying and transmitting a radio signal in radio communication between a base station and a terminal via a fiber optic transmission line, the RoF transceiver including an antenna unit that transmits and/or receives the radio signal, a first amplifier that amplifies a reception signal and generates a first electrical signal, an electrical-optical converter that converts the first electrical signal amplified by the first amplifier into a transmission optical signal and transmits the transmission optical signal to the fiber optic transmission line, an optical-electrical converter that converts a reception optical signal received via the fiber optic transmission line into a second electrical signal, a second amplifier that amplifies the second electrical signal and generate a transmission signal, and a signal processor that inputs the transmission signal amplified by the second amplifier, wherein the signal processor includes a branch unit that branches the transmission signal and acquires a branch signal, a detection unit that detects the branch signal and acquires a voltage value of the branch signal, a determination unit that compares the voltage value of the branch signal with a threshold voltage previously stored in a storage unit and determines whether the voltage value of the branch signal is equal to or greater than the threshold voltage, and a power source controller that controls turning on and off of a power source for the first amplifier according to a determination result determined by the determination unit.

A fiber optic radio system of the present disclosure includes a first transceiver that performs radio communication with a base station, the first transceiver being the above-described RoF transceiver, and a second transceiver that performs radio communication with a terminal, the second transceiver being the above-described RoF transceiver, wherein the first transceiver and the second transceiver are connected via a fiber optic transmission line.

A signal processing method of the present disclosure is a signal processing method executable by a computer, the method including a step of branching a transmission signal and acquiring a branch signal, a step of detecting the branch signal and acquiring a voltage value of the branch signal, a step of comparing the voltage value of the branch signal with a threshold voltage previously stored in a storage unit and determining whether the voltage value of the branch signal is equal to or greater than the threshold voltage, and a step of controlling turning on and off of a power source for a reception signal amplifier according to a determination result that has been determined.

DETAILED DESCRIPTION

Figure 1:
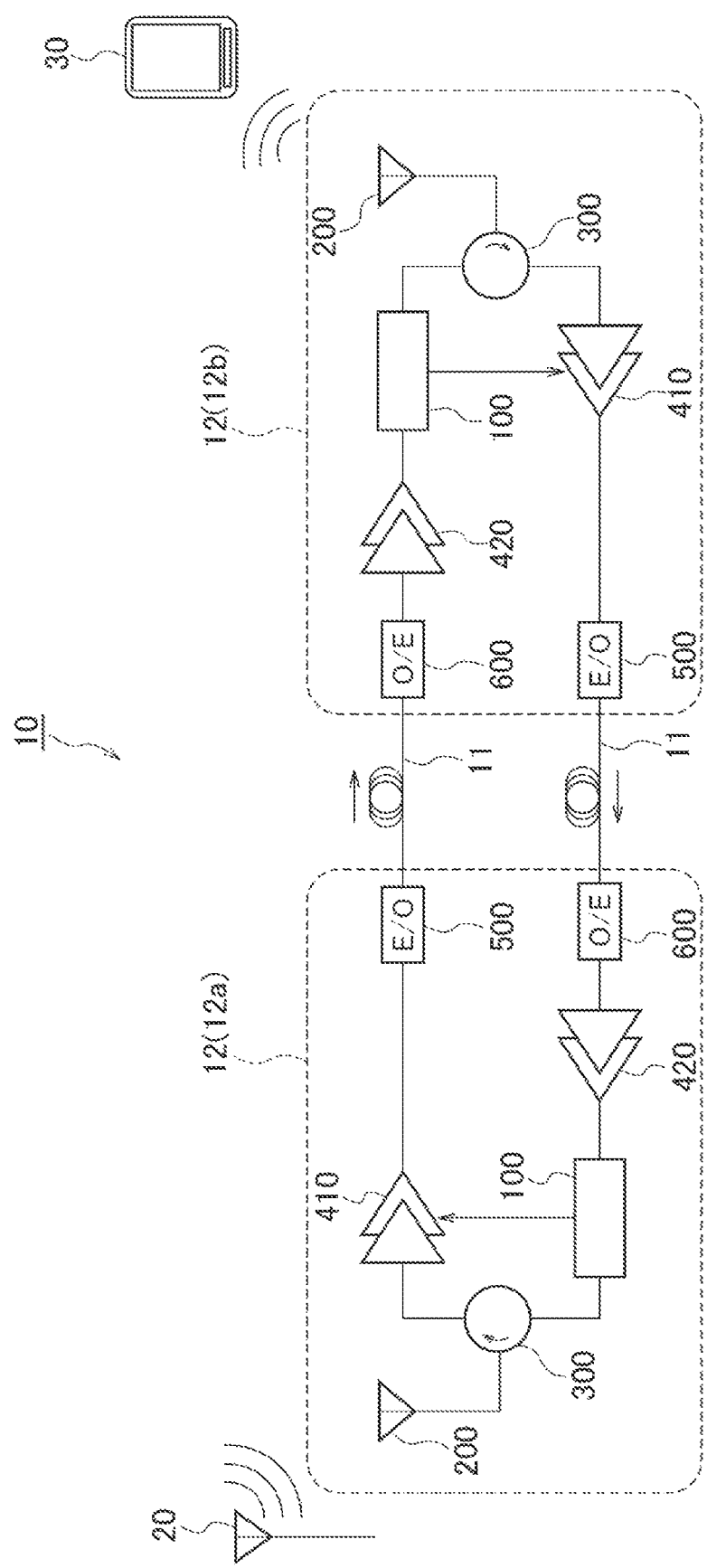
FIG. 1 is a diagram illustrating a configuration of a fiber optic radio system according to a present embodiment.

Various embodiments will be described hereinafter with reference to the accompanying drawings.

A detailed description is given below of a fiber optic radio system 10 according to the present embodiment with reference to the drawings. Dimensional ratios in the drawings are exaggerated for convenience of explanation and are sometimes different from actual ratios. In the following drawings, the same or similar parts are denoted by the same or similar symbols.

(Summary of a Fiber Optic Radio System 10)

FIG. 1 is a diagram illustrating a configuration of a fiber optic radio system 10 according to the present embodiment. The fiber optic radio system 10 includes a first transceiver 12a, a second transceiver 12b, and a fiber optic transmission line 11.

In the fiber optic radio system 10 illustrated in FIG. 1, a radio signal transmitted by a base station 20 is received by the first transceiver 12a at an antenna unit 200, and the first transceiver 12a converts the radio signal into an optical signal. The optical signal converted by the first transceiver 12a is transmitted to the second transceiver 12b via the fiber optic transmission line 11. In the fiber optic radio system 10, the first transceiver 12a and the second transceiver 12b are located at a distance from each other and are capable of performing distant communication. The second transceiver 12b converts the optical signal received via the fiber optic transmission line 11 into an electrical signal and further transmits it as a radio signal to a terminal 30, such as a portable terminal (mobile terminal).

In the fiber optic radio system 10, a radio signal transmitted by the terminal 30 is received by the second transceiver 12b at an antenna unit 200, and the second transceiver 12b converts the radio signal into an optical signal. The optical signal converted by the second transceiver 12b is transmitted to the first transceiver 12a via the fiber optic transmission line 11. The first transceiver 12a converts the optical signal received via the fiber optic transmission line 11 into an electrical signal and further transmits it as a radio signal to the base station 20.

That is, the fiber optic radio system 10 is a system for relaying and transmitting communication between the base station 20 and the terminal 30. Further, the fiber optic radio system 10 is an RoF (Radio over Fiber or Radio on Fiber) system for transmitting a radio signal (RF (radio frequency) signal) over a distance via the fiber optic transmission line 11. The fiber optic radio system 10, which is the RoF system, carries a radio high-frequency signal on an optical fiber and thus is capable of performing long-distance transmission. The fiber optic radio system 10 is capable of delivering radio waves to places where radio waves do not directly reach (dead zones) by taking advantage of the characteristics of low-loss and wide-band optical fibers.

In the typical RoF system, a part of the electric power of the radio signal transmitted from the antenna unit 200 returns via the antenna unit 200, and thus a signal loop is generated and an oscillation occurs in some cases. In the general RoF system, an oscillation may occur not only with a signal loop via the antenna unit 200 but also with a signal loop from a circulator 300 to a first amplifier 410, for example. The fiber optic radio system 10 according to the present embodiment includes a signal processor 100 for preventing such oscillations.

(Configuration of RoF Transceiver 12)

Next, the signal processor 100 according to the present embodiment is described. As illustrated in FIG. 1, the signal processor 100 is provided in the first transceiver 12a and the second transceiver 12b. Note that in the present embodiment, the first transceiver 12a and the second transceiver 12b are assumed to have the same configuration. The first transceiver 12a and the second transceiver 12b are referred to as a "RoF transceiver 12" below when it is not necessary to explain them separately.

The RoF transceiver 12 includes the signal processor 100, the antenna unit 200, the circulator 300, the first amplifier 410, a second amplifier 420, an electrical-optical converter 500 (E/O converter), and an optical-electrical converter 600 (O/E converter). The signal processor 100 is described in detail later.

The antenna unit 200 is used for transmitting and receiving radio signals. The antenna unit 200 converts an electrical signal into a radio signal or converts a radio signal into an electrical signal.

The circulator 300 switches between transmission and reception for a radio signal transmitted via the antenna unit 200 and a radio signal received via the antenna unit 200. That is, when a radio signal is received, the radio signal (reception signal) is sent to the first amplifier 410 via the circulator 300. In contrast, when a radio signal is transmitted, the radio signal (transmission signal) from the second amplifier 420 is sent to the antenna unit 200 via the circulator 300 and transmitted from the antenna unit 200.

That is, using the circulator 300 enables both transmission and reception of radio signals to be performed via the antenna unit 200. Note that the present embodiment has a configuration including the antenna unit 200 and the circulator 300, but this configuration does not limit the configuration of the embodiment. For example, the RoF transceiver 12 may include a transmission antenna and a reception antenna separately without the circulator 300. In this case, the reception antenna is assumed to be connected to the first amplifier 410 of the RoF transceiver 12, and the transmission antenna is assumed to be connected to the second amplifier 420 via a branch unit 111 of the signal processor 100 of the RoF transceiver 12 (see FIG. 2).

The first amplifier 410 amplifies a radio signal received via the antenna unit 200 and the circulator 300. In the present embodiment, the first amplifier 410 is made from a general amplifier (high frequency amplifier, RF amplifier). The first amplifier 410 is capable of turning on and off (enabling and disabling) the signal amplification function with a voltage supplied from a power source circuit (not illustrated). Note that the signal generated through amplification at the first amplifier 410 corresponds to a first electrical signal. The reception signal amplifier corresponds to the first amplifier 410.

The electrical optical converter 500 converts the electrical signal amplified by the first amplifier 410 into an optical signal and transmits the optical signal to the fiber optic transmission path 11. Note that the optical signal transmitted from the electrical optical converter 500 to the fiber optic transmission line 11 corresponds to a transmission optical signal.

The optical-electrical converter 600 converts the optical signal received via the fiber optic transmission line 11 into an electrical signal. Note that the optical signal received by the optical-electrical converter 600 from the fiber optic transmission line 11 corresponds to a reception optical signal. The electrical signal converted by the optical-electrical converter 600 corresponds to a second electrical signal.

The second amplifier 420 amplifies the electrical signal converted by the optical-electrical converter 600. In the present embodiment, the second amplifier 420 is made from a general amplifier (high frequency amplifier, RF amplifier).

(Configuration of Signal Processor 100)

Figure 2:
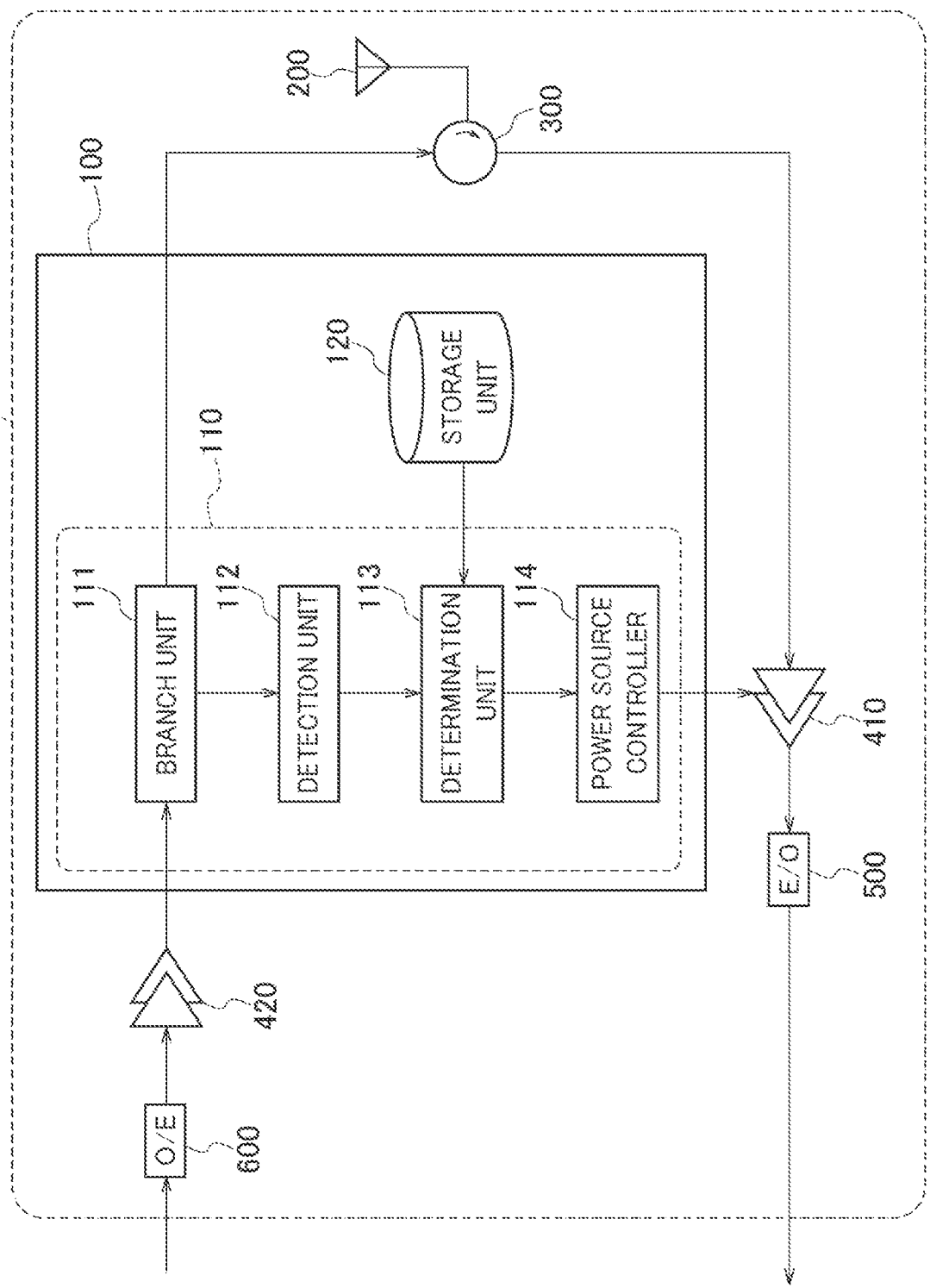
FIG. 2 is a diagram illustrating a functional configuration of a signal processor according to the present embodiment.

Next, the signal processor 100 is described in detail. FIG. 2 is an enlarged schematic view of the second transceiver 12b in FIG. 1 and is a block diagram illustrating the configuration of the signal processor 100 in the second transceiver 12b. As illustrated in FIG. 2, the signal processor 100 includes a controller 110 and a storage unit 120.

The controller 110 may be configured as a general-purpose microcomputer, for example. In this case, the microcomputer may have a computer program installed for functioning as the signal processor 100. By executing the computer program, the microcomputer functions as multiple information processing circuits provided in the signal processor 100. The controller 110 may implement multiple information processing circuits provided in the signal processor 100 with software or may constitute an information processing circuit by preparing dedicated hardware. Multiple information processing circuits may be constituted by individual hardware.

The storage unit 120 may be a ROM (read only memory), a RAM (random access memory), a hard disk, or the like, for example. The storage unit 120 stores a threshold voltage in advance, which is described later.

(Function of Signal Processor 100)

As illustrated in FIG. 2, the controller 110 of the signal processor 100 includes the branch unit 111, a detection unit 112, a determination unit 113, and a power source controller 114 as functions.

The branch unit 111 branches a transmission signal and acquires a branch signal. The branch signal acquired by the branch unit 111 has a power level corresponding to a branch ratio to the transmission signal. In the present embodiment, the branch unit 111 is made from, for example, a coupler. The branch ratio is a value determined according to the characteristics of the branch unit 111 applied to the signal processor 100.

Figure 3A:
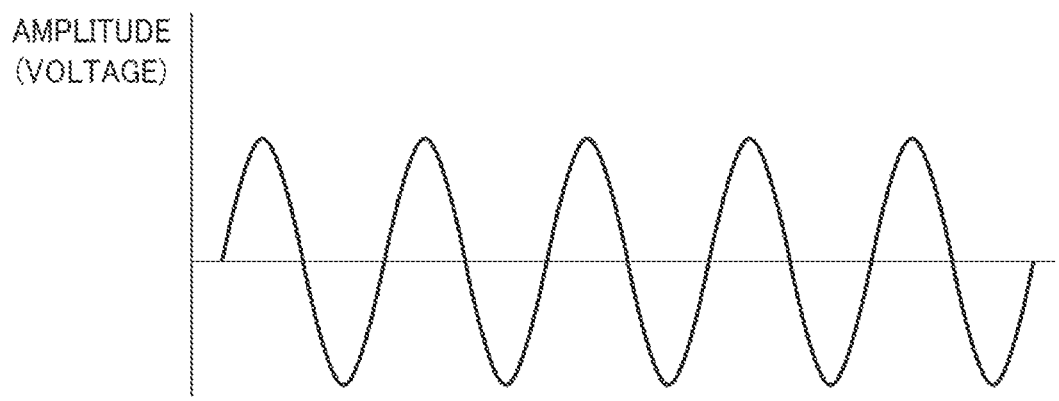
FIG. 3A is a diagram for explaining a transmission signal according to the present embodiment.
Figure 3B:
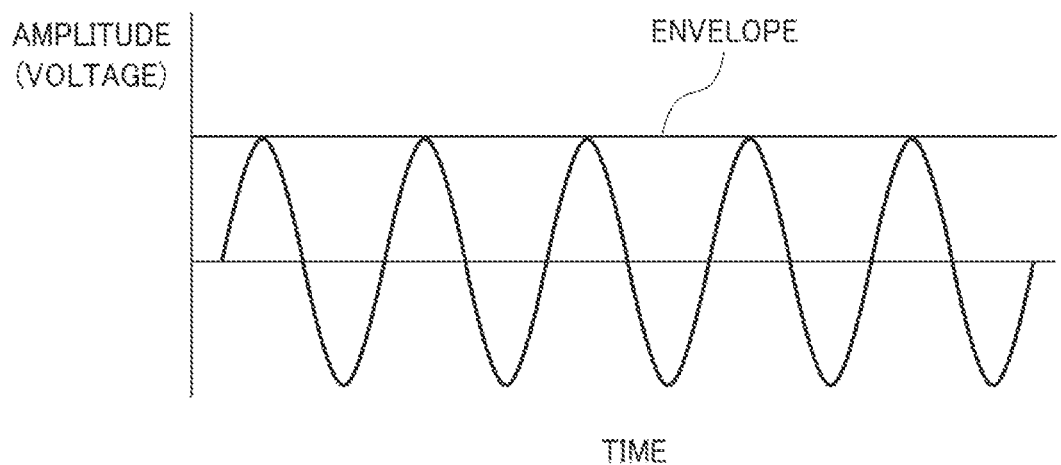
FIG. 3B is a diagram for explaining an envelope of the transmission signal according to the present embodiment.

The detection unit 112 performs envelope detection on the branch signal taken out by the branch unit 111 and calculates a signal level. FIGS. 3A and 3B are schematic diagrams for explaining the input signal and the envelope detection, respectively. Note that the input signals illustrated in FIGS. 3A and 3B are abbreviated for the purpose of explanation, and it is assumed that the signals actually handled by the fiber optic radio system 10 have complex amplitudes.

FIG. 3A illustrates an example of a branch signal taken out by the branch unit 111. The detection unit 112 calculates an envelope for the branch signal illustrated in FIG. 3A and calculates the electric power (signal level) of the branch signal based on the calculated envelope.

Figure 4:
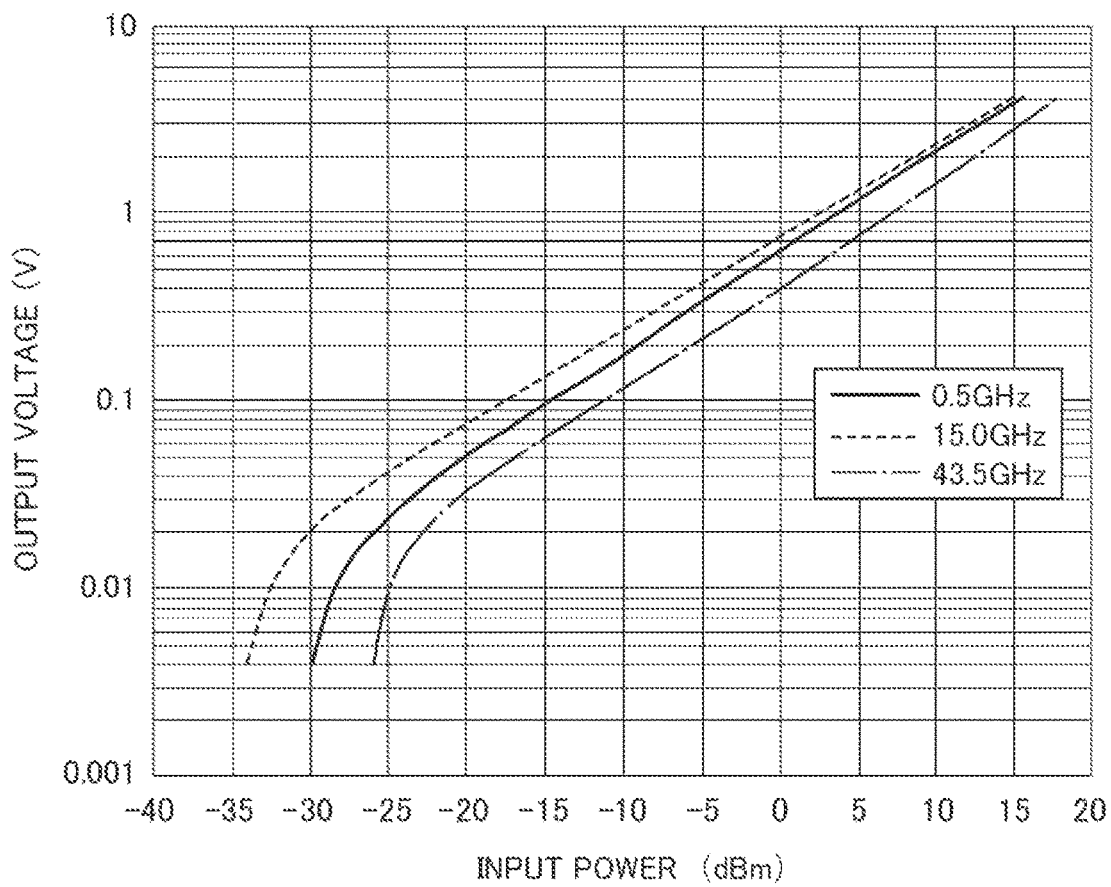
FIG. 4 is a diagram for explaining the relationship between an input power and an output voltage of the fiber optic radio system according to the present embodiment.

The detection unit 112 calculates a voltage value based on the electric power (signal level) of the branch signal. Specifically, the detection unit 112 calculates the voltage value of the branch signal based on the correspondence between the input power (dBm) and the output voltage (V) as illustrated in FIG. 4. Here, dBm is a power level in dB based on 1 mW.

The determination unit 113 compares the voltage value of the branch signal with the threshold voltage previously stored in the storage unit 120 and determines whether the voltage value of the branch signal is equal to or greater than the threshold voltage. In the present embodiment, the threshold voltage is used as a value obtained by converting a threshold reference power described later into a voltage value.

In the present embodiment, the threshold reference power is a power value that is equal to or greater than the power obtained by adding a gain RoF_G in the transmission path of the fiber optic radio system 10 to a minimum received power value (Pin_min) received by the antenna unit 200, and is a power value settable in any manner. That is, when the threshold reference power is P, the threshold reference power P is represented by the following equation (1).

$$P \geq Pin\_min + RoF\_G \quad (1)$$

Note that the minimum received power value (Pin_min) constitutes reception sensitivity in the fiber optic radio system 10, indicates the extent of the capability to receive weak radio waves, and is the minimum input level that satisfies a predetermined error condition. In the present embodiment, the minimum received power value is assumed to be predetermined according to the environment in which the fiber optic radio system 10 is installed.

The gain RoF_G is a gain at the first amplifier 410, the electrical-optical converter 500, the fiber optic transmission line 11, the optical-electrical converter 600, and the second amplifier 420 of the fiber optic radio system 10.

Figure 5:
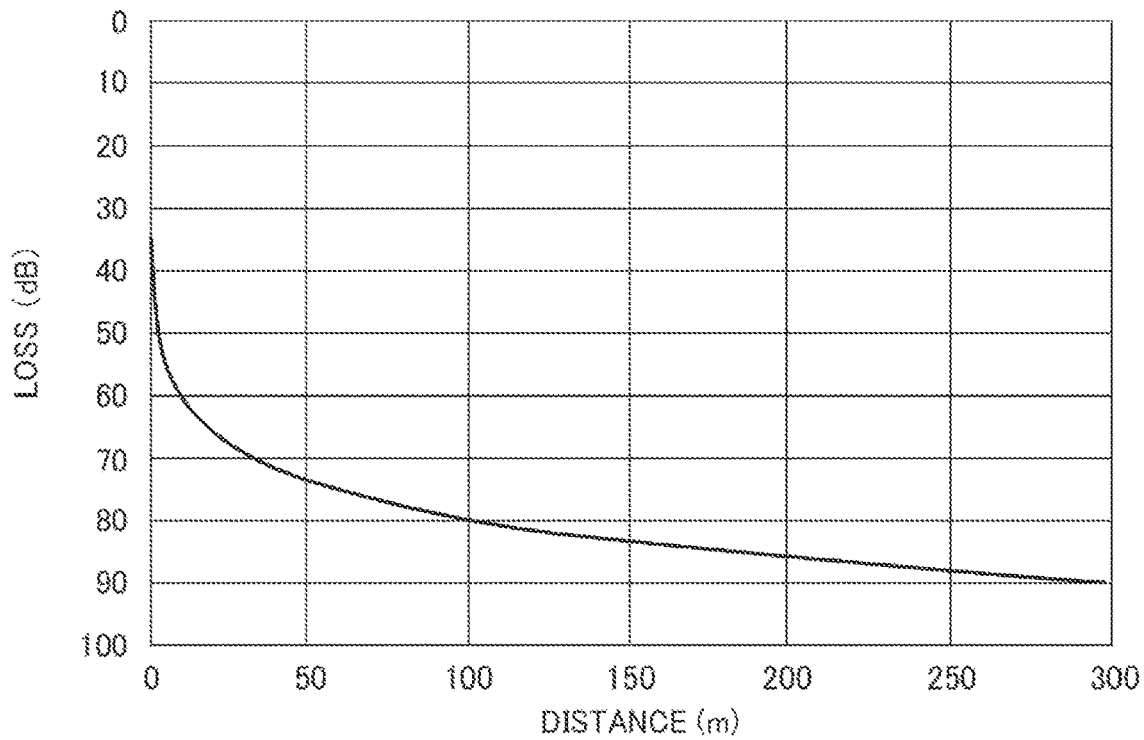
FIG. 5 is a diagram for explaining a basic propagation loss of free space in the fiber optic radio system according to the present embodiment.

The gain RoF_G in the present embodiment is a gain that compensates for the spatial attenuation applied after transmission when a signal is transmitted from the RoF transceiver 12. FIG. 5 illustrates an example of a fundamental propagation loss in free space. A loss L illustrated in FIG. 5 is represented by the following equation (2). Here, d is a distance (m), and X represents a wavelength (m).

$$L = (4\pi d/\lambda)2 \quad (2)$$

As illustrated in FIG. 5, the loss L varies according to the distance d. Thus, in the present embodiment, the gain RoF_G is determined to be a value that only compensates for the loss L determined on the basis of the distance d between the location where the fiber optic radio system 10 is installed and the base station 20 and/or the terminal 30.

The threshold voltage is obtained by converting the threshold reference power P defined by the above equation (1) into a voltage value. The conversion from the threshold reference power P to the threshold voltage is determined by the relationship between the input power and the output voltage illustrated in FIG. 4. In the present embodiment, the threshold voltage is predetermined by a user or the like based on the above-described equations (1) and (2) and the relationship illustrated in FIG. 4, and stored in the storage unit 120.

Note that it is preferable that the threshold voltage have a correlation, such as being in proportion to the received power of the fiber optic radio system 10. For example, as illustrated in FIG. 4, by setting the relationship between the input power and the output voltage to be correlated to some degree, it is possible to realize the signal processor 100 capable of preventing complicated setting of the threshold voltage and suppressing roundabout signals with a simpler configuration.

The power source controller 114 controls turning on and off of the power source for the first amplifier 410 for the reception signal according to the determination result determined by the determination unit 113. Specifically, the power source controller 114 controls the power source for the first amplifier 410 to be turned off when the determination unit 113 determines that the voltage value indicating the signal level of the transmission signal is equal to or greater than the threshold voltage. In contrast, the power source controller 114 controls the power source for the first amplifier 410 to be turned on when the determination unit 113 determines that the voltage value indicating the signal level of the transmission signal is lower than the threshold voltage.

Note that the on and off control of the power source for the first amplifier 410 by the power source controller 114 is realized, for example, by controlling a power source circuit (not illustrated) that generates the power source voltage for the first amplifier 410. Alternatively, the on and off control of the power source for the first amplifier 410 by the power source controller 114 may be configured to physically cut off the conduction in the power source voltage supplied to the first amplifier 410 by an electromagnetic relay or the like. Alternatively, the on and off control of the power source for the first amplifier 410 by the power source controller 114 may be configured by a semiconductor switch using a transistor or the like for the power supplied to the first amplifier 410.

(Summary of Processing Flow in Signal Processor 100)

Figure 6:
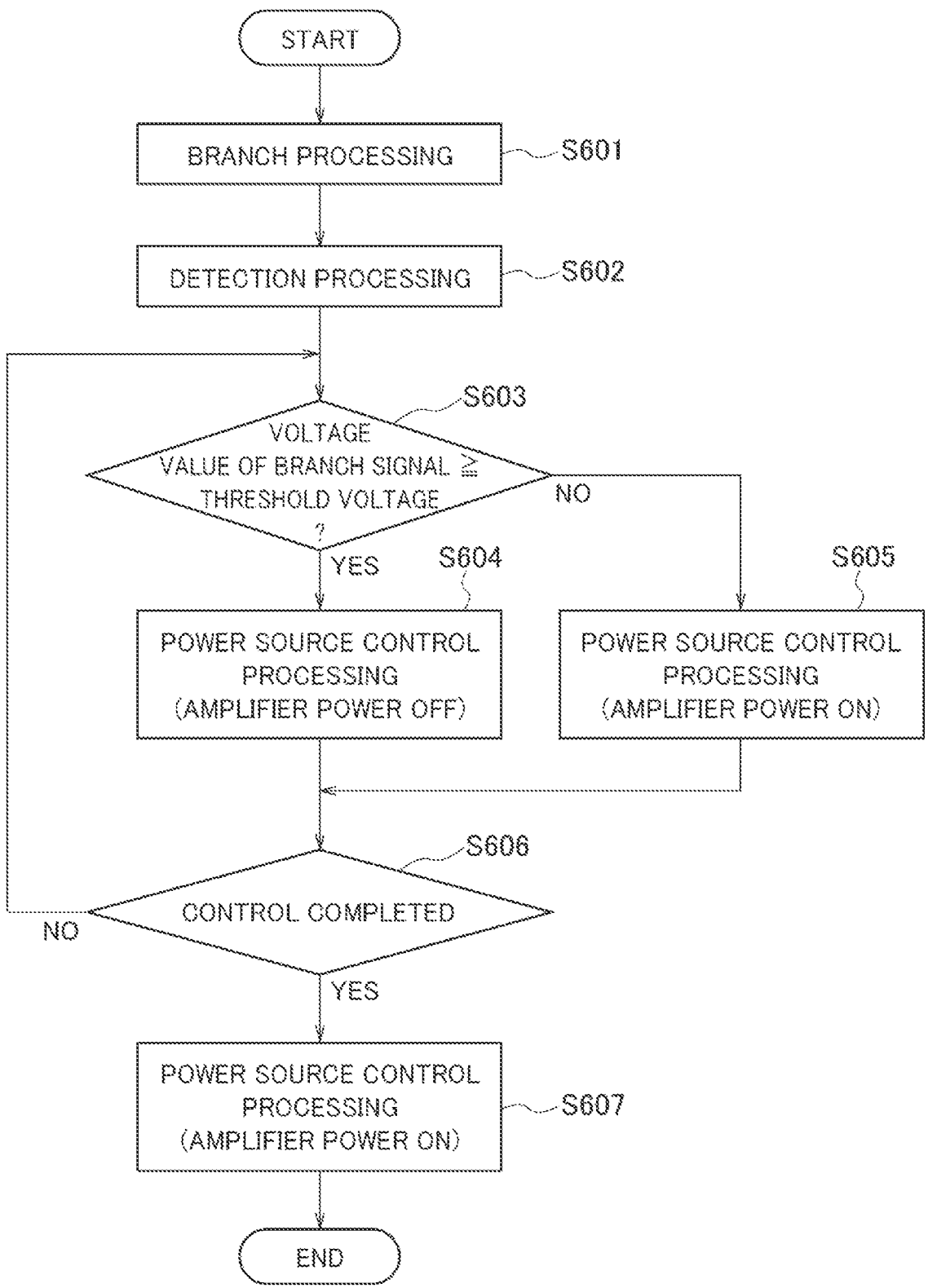
FIG. 6 is a flowchart illustrating an example of processing in the signal processor according to the present embodiment.

Next, the processing flow in the signal processor 100 is described with reference to a flowchart illustrated in FIG. 6. A series of operations of the signal processor 100 illustrated in the flowchart in FIG. 6 is started when the signal processor 100 is started, and the processing is ended when the operation is completed. In the flowchart illustrated in FIG. 6, the processing is also terminated by power off or an interruption for processing completion. In the following description of the flowchart, the same contents as those described in the above description of the fiber optic radio system 10 and the signal processor 100 are omitted or simplified.

In step S601, the branch unit 111 performs branch processing on a transmission signal. Specifically, the branch unit 111 branches the transmission signal and acquires a branch signal. Then, the processing proceeds to step S602.

In step S602, the detection unit 112 performs detection processing on the branch signal. Specifically, the detection unit 112 performs envelope detection on the branch signal taken out by the branch unit 111 and calculates a signal level. In step S602, the detection unit 112 calculates a voltage value based on the electric power (signal level) of the branch signal. Then, the processing proceeds to step S603.

In step S603, the determination unit 113 determines whether the voltage value of the signal level of the branch signal calculated by the detection unit 112 is equal to or greater than a threshold voltage previously stored in the storage unit 120. When the determination unit 113 determines in step S603 that the voltage value of the signal level of the branch signal is equal to or greater than the threshold voltage (step S603: YES), the processing proceeds to step S604. In contrast, when the determination unit 113 determines in step S603 that the voltage value of the signal level of the branch signal is lower than the threshold voltage (step S603: NO), the processing proceeds to step S605.

In step S604, the power source controller 114 performs power source control processing on the first amplifier 410. Specifically, the power source controller 114 controls the power source circuit of the first amplifier 410 to turn off the power source voltage supplied to the first amplifier 410. Next, the processing proceeds to step S606.

In step S605, the power source controller 114 performs power source control processing on the first amplifier 410. Specifically, the power source controller 114 controls the power source circuit of the first amplifier 410 to turn on the power source voltage supplied to the first amplifier 410. Next, the processing proceeds to step S606.

In step S606, the controller 110 determines whether the control has been completed in the signal processor 100. When the controller 110 determines in step S606 that the control has been completed in the signal processor 100 (step S606: YES), the processing proceeds to step S607. In contrast, when the controller 110 determines in step S606 that the control has not been completed in the signal processor 100 (step S606: NO), the processing returns to step S603, and the processing from step S603 is repeated.

In step S607, the power source controller 114 performs power source control processing on the first amplifier 410. Specifically, the power source controller 114 controls the power source circuit of the first amplifier 410 to turn on the power source voltage supplied to the first amplifier 410. As a result, in the fiber optic radio system 10, normal radio communication is assumed to be performed.

As described above, the signal processor 100 is provided in a transceiver for transmitting and receiving radio signals and includes the branch unit 111, the detection unit 112, the determination unit 113, and the power source controller 114. The branch unit 111 branches a transmission signal and acquires a branch signal. The detection unit 112 detects the branch signal and acquires a voltage value of the branch signal. The determination unit 113 compares the voltage value of the branch signal with a threshold voltage previously stored in the storage unit 120 and determines whether the voltage value of the branch signal is equal to or greater than the threshold voltage. The power source controller 114 controls turning on and off of the power source for the reception signal amplifier of the transceiver according to the determination result determined by the determination unit 113.

Thus, the signal processor 100 does not need to include multiple delay circuits corresponding to frequencies and makes it possible to suppress roundabout signals with a simple configuration.

The threshold voltage of the signal processor 100 may be a value determined based on the minimum received power value of the fiber optic radio system including the transceiver, and the gain in the transmission path of the fiber optic radio system. Thus, the signal processor 100 makes it possible to use the threshold voltage corresponding to the fiber optic radio system and to perform a more accurate threshold determination corresponding to the system.

Other Embodiments

Although the embodiment has been described in detail with reference to the drawings, the present embodiment is not limited by the contents described in the above embodiment. The constituent elements described above include those that may easily occur to a person skilled in the art and those that are substantially equivalent. It is possible to combine the above-described configurations in an appropriate manner. It is possible to make various omissions, substitutions, or changes in configuration without departing from the gist of the embodiments.

The above embodiment exemplifies an example in which the signal processor 100 is applied to the fiber optic radio system 10 including the first transceiver 12a, the second transceiver 12b, and the fiber optic transmission line 11. The signal processor 100 may be used not only in a system for relaying and transmitting via the fiber optic transmission line 11, but also in a system for relaying and transmitting via a cable, such as a high-frequency coaxial cable or a twisted pair cable.

A computer program (signal processing program) for causing a computer to execute the processing (signal processing method) in the signal processor 100 described above, and a non-transitory computer readable storage medium having the program stored thereon are included within the scope of the present embodiment. The type of non-transitory computer readable storage medium may be any type. The above-described computer program is not limited to one stored on a non-transitory storage medium and may be one transmitted via a telecommunications line, a wireless or wired communication line, a network represented by the Internet, or the like.

A description of characteristics of the signal processor 100, the RoF transceiver 12, the fiber optic radio system 10, and the signal processing method is given below.

The signal processor 100 according to a first aspect is provided in a transceiver for transmitting and receiving a radio signal and includes the branch unit 111 that branches a transmission signal and acquires a branch signal, and the detection unit 112 that detects the branch signal and acquires a voltage value of the branch signal. The signal processor 100 also includes the determination unit 113 that compares the voltage value of the branch signal with a threshold voltage previously stored in the storage unit 120 and determines whether the voltage value of the branch signal is equal to or greater than the threshold voltage. The signal processor 100 further includes the power source controller 114 that controls turning on and off of a power source for a reception signal amplifier of the transceiver according to a determination result determined by the determination unit 113.

The above-described configuration eliminates the need to provide the signal processor 100 with multiple delay circuits corresponding to frequencies and makes it possible to suppress roundabout signals with a simple configuration.

The threshold voltage of the signal processor 100 according to a second aspect may be a value determined on the basis of a minimum received power value of a fiber optic radio system including the transceiver, and a gain in a transmission path of the fiber optic radio system.

The above-described configuration enables the signal processor 100 to use a threshold voltage corresponding to the fiber optic radio system and to perform more accurate threshold determination corresponding to the system.

The RoF transceiver 12 according to a third aspect is an RoF (Radio over Fiber) transceiver for relaying and transmitting a radio signal in radio communication between the base station 20 and the terminal 30 via the fiber optic transmission line 11. The RoF transceiver 12 includes the antenna unit 20 that transmits and/or receives the radio signal, and the first amplifier 140 that amplifies a reception signal and generates a first electrical signal. The RoF transceiver 12 also includes the electrical-optical converter 500 that converts the first electrical signal amplified by the first amplifier 410 into a transmission optical signal and transmits the transmission optical signal to the fiber optic transmission line 11. The RoF transceiver 12 also includes the optical-electrical converter that converts a reception optical signal received via the fiber optic transmission line 11 into a second electrical signal 600. The RoF transceiver 12 also includes the second amplifier 420 that amplifies the second electrical signal and generates a transmission signal, and the signal processor 100 that inputs the transmission signal amplified by the second amplifier 420. The signal processor 100 includes the branch unit 111 that branches the transmission signal and acquires a branch signal, and the detection unit 112 that detects the branch signal and acquires a voltage value of the branch signal. The signal processor 100 also includes the determination unit 113 that compares the voltage value of the branch signal with a threshold voltage previously stored in the storage unit 120 and determines whether the voltage value of the branch signal is equal to or greater than the threshold voltage. The signal processor 100 further includes the power source controller 114 that controls turning on and off of a power source for the first amplifier 410 according to a determination result determined by the determination unit 113.

The above-described configuration eliminates the need to provide the RoF transceiver 12 including the signal processor 100 with multiple delay circuits corresponding to frequencies and makes it possible to suppress roundabout signals with a simple configuration.

The fiber optic radio system 10 according to a fourth aspect includes the first transceiver 12a that performs radio communication with the base station 20, the first transceiver 12a being the above-described RoF transceiver 12, and the second transceiver 12b that performs radio communication with the terminal 30, the second transceiver being the above-described RoF transceiver 12. In the fiber optic radio system 10, the first transceiver 12a and the second transceiver 12b are connected via the fiber optic transmission line 11.

The above-described configuration eliminates the need to provide the fiber optic radio system 10 including the RoF transceiver 12 with multiple delay circuits corresponding to frequencies and makes it possible to suppress roundabout signals with a simple configuration.

The signal processing method according to a fifth aspect is a signal processing method executable by a computer and includes a step of branching a transmission signal and acquiring a branch signal, and a step of detecting the branch signal and acquiring a voltage value of the branch signal. The signal processing method also includes a step of comparing the voltage value of the branch signal with a threshold voltage previously stored in the storage unit 120 and determining whether the voltage value of the branch signal is equal to or greater than the threshold voltage. The signal processing method further includes a step of controlling turning on and off of a power source for a reception signal amplifier according to a determination result that has been determined.

In the above-described configuration, using the signal processing method eliminates the need to provide multiple delay circuits corresponding to frequencies and makes it possible to suppress roundabout signals with a simple configuration.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A signal processor provided in a transceiver for transmitting and receiving a radio signal, the signal processor comprising:
   a branch unit configured to branch a transmission signal and acquire a branch signal;
   a detection unit configured to detect the branch signal and acquire a voltage value of the branch signal;
   a determination unit configured to compare the voltage value of the branch signal with a threshold voltage previously stored in a storage unit and determine whether the voltage value of the branch signal is equal to or greater than the threshold voltage; and
   a power source controller configured to control turning on and off of a power source for a reception signal amplifier of the transceiver according to a determination result determined by the determination unit.

2. The signal processor according to claim 1, wherein the threshold voltage is a value determined on the basis of a minimum received power value of a fiber optic radio system including the transceiver, and a gain in a transmission path of the fiber optic radio system.

3. An RoF (Radio over Fiber) transceiver for relaying and transmitting a radio signal in radio communication between a base station and a terminal via a fiber optic transmission line, the RoF transceiver comprising:
   an antenna unit configured to transmit and/or receive the radio signal;
   a first amplifier configured to amplify a reception signal and generate a first electrical signal;
   an electrical-optical converter configured to convert the first electrical signal amplified by the first amplifier into a transmission optical signal and transmit the transmission optical signal to the fiber optic transmission line;
   an optical-electrical converter configured to convert a reception optical signal received via the fiber optic transmission line into a second electrical signal;
   a second amplifier configured to amplify the second electrical signal and generate a transmission signal; and
   a signal processor configured to input the transmission signal amplified by the second amplifier, wherein
   the signal processor includes:
   a branch unit configured to branch the transmission signal and acquire a branch signal;
   a detection unit configured to detect the branch signal and acquire a voltage value of the branch signal;
   a determination unit configured to compare the voltage value of the branch signal with a threshold voltage previously stored in a storage unit and determine whether the voltage value of the branch signal is equal to or greater than the threshold voltage; and
   a power source controller configured to control turning on and off of a power source for the first amplifier according to a determination result determined by the determination unit.

4. A fiber optic radio system, comprising:
   a first transceiver configured to perform radio communication with a base station, the first transceiver being the RoF transceiver according to claim 3; and
   a second transceiver configured to perform radio communication with a terminal, the second transceiver being the RoF transceiver according to claim 3, wherein
   the first transceiver and the second transceiver are connected via a fiber optic transmission line.

5. A signal processing method executable by a computer, the method comprising:
   branching a transmission signal and acquiring a branch signal;
   detecting the branch signal and acquiring a voltage value of the branch signal;
   comparing the voltage value of the branch signal with a threshold voltage previously stored in a storage unit and determining whether the voltage value of the branch signal is equal to or greater than the threshold voltage; and
   controlling turning on and off of a power source for a reception signal amplifier according to a determination result that has been determined.

* * * * *